Feb. 15, 1927.  
W. C. SANDERS  
1,617,349  
CAR AXLE BEARING  
Filed Oct. 19, 1925
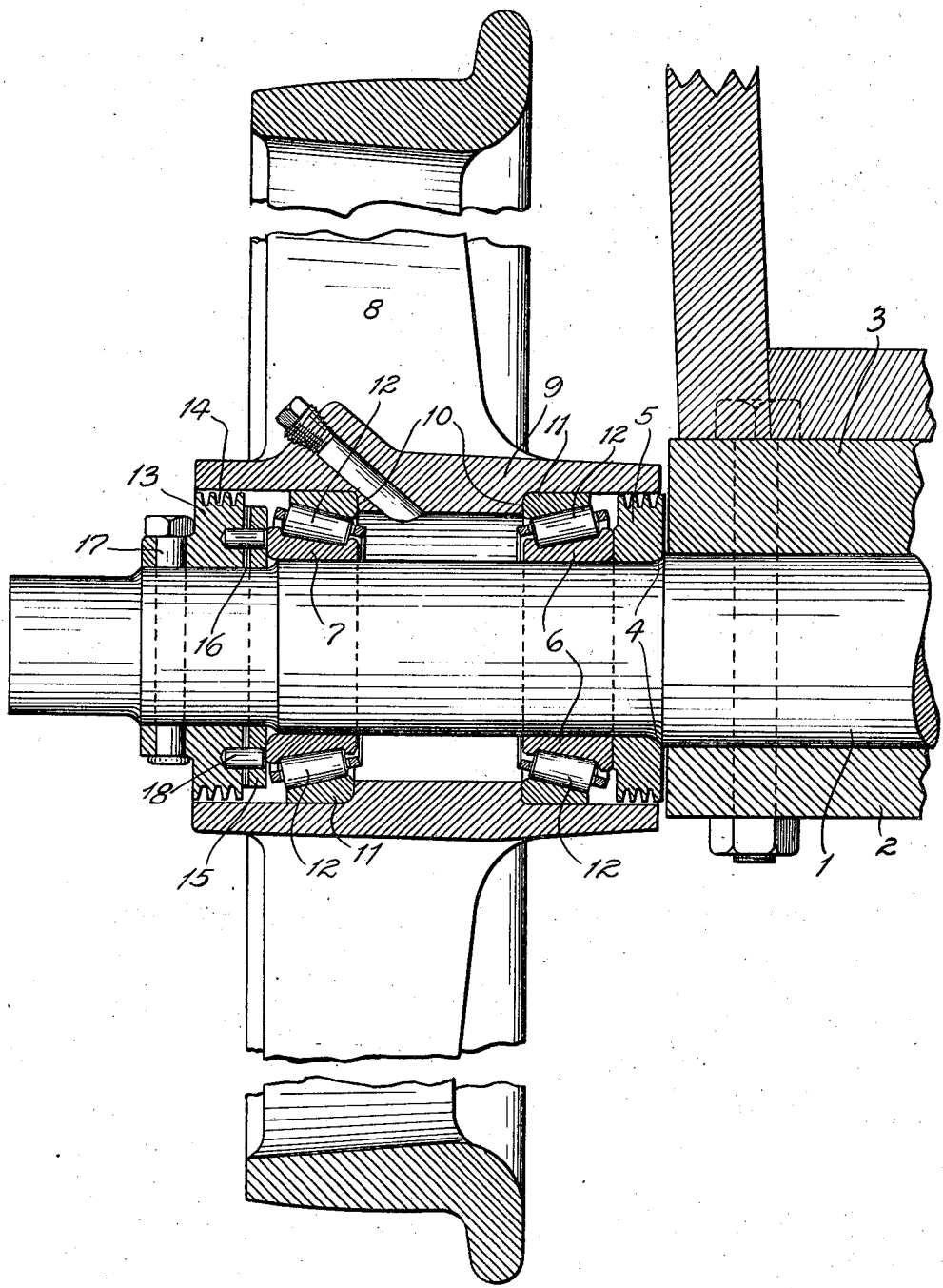
INVENTOR:-  
Walter C. Sanders,  
by Carr & Carr,  
HIS ATTORNEYS.

Patented Feb. 15, 1927.

1,617,349

UNITED STATES PATENT OFFICE.

WALTER C. SANDERS, OF CANTON, OHIO, ASSIGNOR TO THE TIMKEN ROLLER BEARING COMPANY, OF CANTON, OHIO, A CORPORATION OF OHIO.

CAR-AXLE BEARING.

Application filed October 19, 1925. Serial No. 63,347.

My invention relates to bearing constructions for railway car axles and the like; and has for its principal objects the protection of the wheel bearings from thrust due to the movement of the car body and the provision of simple means for adjusting the bearings and for securely holding them in position.

The invention consists principally in providing the axles of the car with thrust collars that receive the thrust of the body of the car, thus relieving the wheels and bearings. The invention further consists in the hereinafter described means for adjusting the bearings and for securing them on the axle. The invention further consists in the car axle bearing and in the parts and combinations and arrangements of parts hereinafter described and claimed.

The accompanying drawing, which forms part of this specification, is a longitudinal sectional view of a mine car bearing construction embodying my invention.

The drawing shows one end only of one axle of a mine car or like railway car, but it will be understood that the other end of the axle is similar in construction. Mounted loosely on each car axle 1 some distance from each end thereof is a box 2 to which is secured a member 3 for supporting the car body. Adjacent to the box 2, the axle 1 is preferably reduced slightly in diameter, forming a curved shoulder 4. A thrust collar 5 is mounted on the end of the axle and has a curved portion fitting said curved shoulder 4 on the axle. Said thrust collar 5 is permanently secured to the axle so as to be, in effect, an integral part thereof. Preferably the collar 5 is secured in position by being heated and then shrunk onto the axle. Obviously, the collar may be secured in other ways, or may be made integral with the axle, as by being upset thereon.

Abutting against the thrust collar 5 is the cone 6 or inner bearing member of a conical roller bearing. A similar cone 7 or inner bearing member is mounted on the axle 1 near the outer end thereof, the cones being illustrated in the drawing as having their small ends towards each other. Mounted on the end of the axle is a wheel 8 whose hub portion 9 is provided with shoulders 10 against which are disposed the cups 11 that cooperate with said cones 6 and 7, conical rollers 12 being interposed between said cups and cones.

Mounted on the end portion of the axle 1 is a sleeve 13 that has a projecting annular rib portion 14 that forms a dust closure and oil retainer for the outer end of the hub portion 9 of the wheel 8. Interposed between the sleeve 13 and the cone 7 of the outermost roller bearing is a washer 15 of hardened metal. Interposed between the washer 15 and the face of said sleeve 13 are a plurality of shims 16. The bearings are adjusted by removing the sleeve and adding shims.

Extending through holes in said washer and shims and into said sleeve are hardened pins 18 that prevent relative rotation of the sleeve, washer and shims. The sleeve 13 is secured to the axle 1 as by a linch pin 17 extending through holes in said sleeve and axle.

The above described construction has numerous advantages. It will be understood that in rounding curves and under certain strains, the car body and the boxes 2 will shift lengthwise of the axle. The thrust collars 5 receive this thrust and prevent cramping of the wheels 8 and injury to the hub portions 9 thereof and displacement of the bearings. The bearings are firmly secured in position and are easily adjusted. The arrangement of sleeve, washer, pins and shims prevents relative rotation of said parts and thus prevents the shims from being ground to pieces. Obviously, numerous changes may be made without departing from the invention and I do not wish to be limited to the precise construction shown.

What I claim is:

1. A construction of the kind described comprising an axle, a body supporting member mounted on said axle, a body on said supporting member, a roller bearing interposed between said wheel and said axle and a thrust collar rigid on said axle between the inner bearing member of said bearing and said body supporting member, said inner bearing member abutting against said thrust collar and said body supporting member being normally spaced therefrom, whereby thrust resulting from movement of said body supporting member on said axle is taken up by said thrust collar without affecting the bearings.

2. A construction of the kind described comprising an axle, a body supporting member mounted on said axle, a body on said supporting member, roller bearings interposed between said wheel and said axle and thrust collars rigid on said axle, the inner bearing members of said bearings abutting against said thrust collars, the width of said body supporting member being less than the distance between said thrust collars and the distance between the ends of said body supporting members and said thrust collars being less than the distance between any portion of the body and said wheels; whereby thrust resulting from movement of the body and body supporting member on the axle is taken up by said thrust collars.

3. A bearing construction comprising an axle, a wheel thereon, a conical roller bearing between said axle and wheel, a sleeve secured to said axle to rotate therewith, a washer abutting against the inner bearing member of said bearing, shims interposed between said sleeve and said washer and means for preventing relative movement of said shims, sleeve and washer.

4. A bearing construction comprising an axle, a wheel thereon, a conical roller bearing between said axle and wheel, a sleeve secured to said axle to rotate therewith, a washer abutting against the inner bearing member of said bearing, shims interposed between said sleeve and said washer and pins extending through holes in said sleeve, washer and shims.

5. A bearing construction comprising an axle, a wheel thereon, a conical roller bearing between said axle and wheel, a sleeve on said axle and secured thereto by means of a linch pin extending through a set of alining holes in said sleeve and axle and spacing means interposed between said sleeve and the inner bearing member of said bearing.

6. A bearing construction comprising a wheel having a hollow hub portion provided with annular shoulders, an axle having a reduced journal portion extending into said hub portion of said wheel, a thrust collar rigidly secured to said axle against the shoulder at the innermost end of the journal portion of the axle, conical roller bearings interposed between said journal and said hub portion of said wheel, the cups of said roller bearings being disposed against said shoulders in said hub portion, the cone of the innermost roller bearing abutting against said thrust collar and the cone of the outermost bearing being mounted on said journal portion, a sleeve secured to the outer end of said axle for maintaining said cone of said outermost bearing in position, a linch pin extending through alining holes in said sleeve and axle for securing them together and spacing means interposed between said sleeve and the outermost bearing cone.

7. A bearing construction comprising a wheel having a hollow hub portion provided with annular shoulders, an axle having a reduced journal portion extending into said hub portion of said wheel, a thrust collar rigidly secured to said axle at the innermost end of the journal portion of the axle, said thrust collar also constituting a closure for the hub portion of said wheel, conical roller bearings interposed between said journal and said hub portion of said wheel, the cups of said roller bearings being disposed against said shoulders in said hub portion, the cone of the innermost roller bearing abutting against said thrust collar and the cone of the outermost bearing being mounted on said journal portion, a sleeve secured to the outer end of said axle to rotate therewith, said sleeve constituting a closure for the outer end of the hub portion of said wheel, a hardened washer and shims interposed between said sleeve and said bearing cone, and means for preventing relative rotation of said sleeve, shims and washer.

8. A construction of the kind described comprising an axle, a body supported thereon, conical roller bearings interposed between said wheel and said axle, a thrust collar rigid on said axle, the inner bearing cone of the innermost conical roller bearing abutting against said thrust collar and said body being normally spaced therefrom and means for securing said bearings on said axle and for adjusting them, whereby thrust resulting from the movement of said body on said axle is taken up by said thrust collar without affecting said bearings.

Signed at Canton, Ohio, this 12th day of October, 1925.

WALTER C. SANDERS.